United States Patent
Kuwabara et al.

(10) Patent No.: US 9,849,933 B2
(45) Date of Patent: Dec. 26, 2017

(54) FRONT SUSPENSION STRUCTURE FOR SADDLE RIDING TYPE VEHICLE

(71) Applicant: HONDA MOTOR CO., LTD., Tokyo (JP)

(72) Inventors: Naoki Kuwabara, Wako (JP); Jun Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 279 days.

(21) Appl. No.: 14/663,876

(22) Filed: Mar. 20, 2015

(65) Prior Publication Data
US 2015/0274250 A1 Oct. 1, 2015

(30) Foreign Application Priority Data
Mar. 31, 2014 (JP) .................................. 2014-072015

(51) Int. Cl.
| B62K 11/14 | (2006.01) |
| B62K 21/20 | (2006.01) |
| B62K 21/22 | (2006.01) |
| B62K 25/24 | (2006.01) |

(52) U.S. Cl.
CPC .................................. B62K 25/24 (2013.01)

(58) Field of Classification Search
CPC ...... B62K 21/125; B62K 21/02; B62K 21/14; B62K 21/16; B62K 21/18; B62K 21/20; B62K 21/22; B62K 25/24; B62K 11/12; B62K 11/14
USPC .............. 280/276, 277; 74/544, 551.1, 551.2
See application file for complete search history.

(56) References Cited

U.S. PATENT DOCUMENTS

| 4,179,135 A | * | 12/1979 | Slater | B62K 25/24 280/276 |
| 4,388,978 A | * | 6/1983 | Fior | B62K 25/24 180/219 |
| 4,627,632 A | * | 12/1986 | McKagen | B62K 25/24 180/219 |
| 4,685,694 A | * | 8/1987 | Kouyama | B62K 21/00 280/263 |

(Continued)

FOREIGN PATENT DOCUMENTS

| DE | 325034 | * | 9/1920 | ............ B62K 25/04 |
| DE | 9404873 | * | 6/1994 | ............ B62K 21/02 |
| GB | 1274441 | * | 5/1969 | ............ B62K 25/08 |

(Continued)

*Primary Examiner* — Anne Marie Boehler
(74) *Attorney, Agent, or Firm* — Westerman, Hattori, Daniels & Adrian, LLP

(57) ABSTRACT

A front suspension structure includes a head pipe radially internally supporting a shaft portion forming a steering axis such that the shaft portion is rotatable about the steering axis; a front fork connected to a lower end portion of the shaft portion on a lower side of the head pipe, the front fork supporting an axle of a steering wheel; a link member having one end portion connected rotatably on an upper side of a turning member having the shaft portion, and having another end portion connected rotatably on a side of handlebars; the head pipe disposed so as to be separated frontward from a vehicle body frame; and a rocking arm having a front end portion rockably supported by the head pipe, and having a rear end portion rockably supported by the vehicle body frame.

4 Claims, 9 Drawing Sheets

(56) References Cited

U.S. PATENT DOCUMENTS 5,069,467 A * 12/1991 Claudio ................ B62K 25/24
                                                        280/276
7,896,379 B2 * 3/2011 Nagao .................... B62K 25/24
                                                        280/276

FOREIGN PATENT DOCUMENTS

JP            4-169386 A    6/1992
WO    WO2007/131590    * 11/2007  ............. B62K 25/04

* cited by examiner

FRONT SUSPENSION STRUCTURE FOR SADDLE RIDING TYPE VEHICLE

FIELD OF THE INVENTION

This application relates to a front suspension structure for a saddle riding type vehicle.

BACKGROUND OF THE INVENTION

One example of a conventional front suspension structure for a saddle riding type vehicle is disclosed in Japanese Patent Laid-Open No. Hei 4-169386 ("JP '386"). This structure supports a steering shaft link, which steerably supports a front fork, and a vehicle body frame by front and rear end portions of an upper arm portion and a lower arm portion each extending longitudinally. The steering shaft link is disposed on the inside in a radial direction of the front fork.

SUMMARY OF THE INVENTION

One problem with the aforementioned structure of JP '386 is that, when the front end portions of the upper and lower arm portions are supported by the steering shaft link on the inside in the radial direction of the front fork (head pipe) (a type in which the head pipe rotates), the positions at which the front end portions of the upper and lower arm portions are supported are inevitably the upper and lower end portions of the steering shaft link which end portions project above and below the head pipe. Therefore, a degree of freedom of the position at which the arm portion is supported is lowered.

Therefore, one objective of the present invention is to increase a degree of freedom of the position at which an arm portion is supported in a front suspension structure for a saddle riding type vehicle which structure supports a steering member by the arm portion rocking vertically.

To achieve this objective, one aspect of the present invention includes a head pipe (12) radially internally supporting a shaft portion (13b) forming a steering axis (C3) such that the shaft portion (13b) is rotatable about the steering axis (C3); a front fork (19) connected to a lower end portion of the shaft portion (13b) on a lower side of the head pipe (12), the front fork (19) supporting an axle (9a) of a steering wheel (9); and a link member (15) having one end portion connected rotatably on an upper side of a turning member (13) having the shaft portion (13b), and having another end portion connected rotatably on a side of handlebars (8); the head pipe (12) being disposed so as to be separated frontward from a vehicle body frame (1); a rocking arm (16) having a front end portion rockably supported by the head pipe (12), and having a rear end portion rockably supported by the vehicle body frame (1). Accordingly, the front end portion of the rocking arm is supported by the head pipe on the outside in the radial direction of the shaft portion forming the steering axis. Thus, the position at which the rocking arm is supported can be set arbitrarily. Hence, a degree of freedom of the position at which the arm portion is supported can be increased. In addition, because a turning system of the turning member and the like and a rocking system of the rocking arm and the like are separated from each other, the turning system is not readily affected by rocking.

According to a second aspect of the present invention, the rocking arm (16) includes an upper arm portion (17) and a lower arm portion (18) vertically separated from each other, the head pipe (12) is inclined such that an upper side of the head pipe (12) is located more rearward than a lower side of the head pipe (12) as viewed from a side, a front end portion (17a) of the upper arm portion (17) is in front of the steering axis (C3) and is supported by a front upper portion of the head pipe (12), and a front end portion (18a) of the lower arm portion (18) is in a rear of the steering axis (C3) and is supported by a rear lower portion of the head pipe (12). Accordingly, spaces of the front upper portion and the rear lower portion of the head pipe which spaces are created by the inclination of the head pipe can be utilized effectively as spaces for supporting the respective front end portions of the upper and lower arm portions. It is therefore possible to make the front suspension structure compact and thus shorten an overall length of the front suspension structure. In addition, because the respective front end portions of the upper and lower arm portions are distributed longitudinally, the concentration of force on one part can be prevented.

According to a third aspect of the present invention, the front end portion (17a) of the upper arm portion (17) and the front end portion (18a) of the lower arm portion (18) are rockably supported via coupling members (34a, 36a), respectively, the coupling members (34a, 36a) penetrating connecting portions (12a, 12b) of the head pipe (12) and extending along a vehicle width direction. Accordingly, the upper and lower arm portions can be supported by the respective coupling members so as to avoid the head pipe. Therefore the respective front end portions of the upper and lower arm portions can be supported with high rigidity.

According to a fourth aspect of the present invention, the front end portion (17a) of the upper arm portion (17) and the front end portion (18a) of the lower arm portion (18) are connected respectively to connecting portions (12a, 12b) of the head pipe (12) rockably about coupling axes (C9, C11) along the vehicle width direction, and at least one of the coupling axes (C9, C11) is disposed between an upper end and a lower end of the head pipe (12) as viewed from the side. Accordingly, the respective front end portions of the upper and lower arm portions can be supported on the head pipe compactly.

BRIEF DESCRIPTION OF THE DRAWINGS

The present invention will be described with reference to the accompanying drawings, wherein:

FIG. 9 is a left side view showing various axes of the front wheel suspension device and the like.

DETAILED DESCRIPTION OF THE INVENTION

Figure 1:
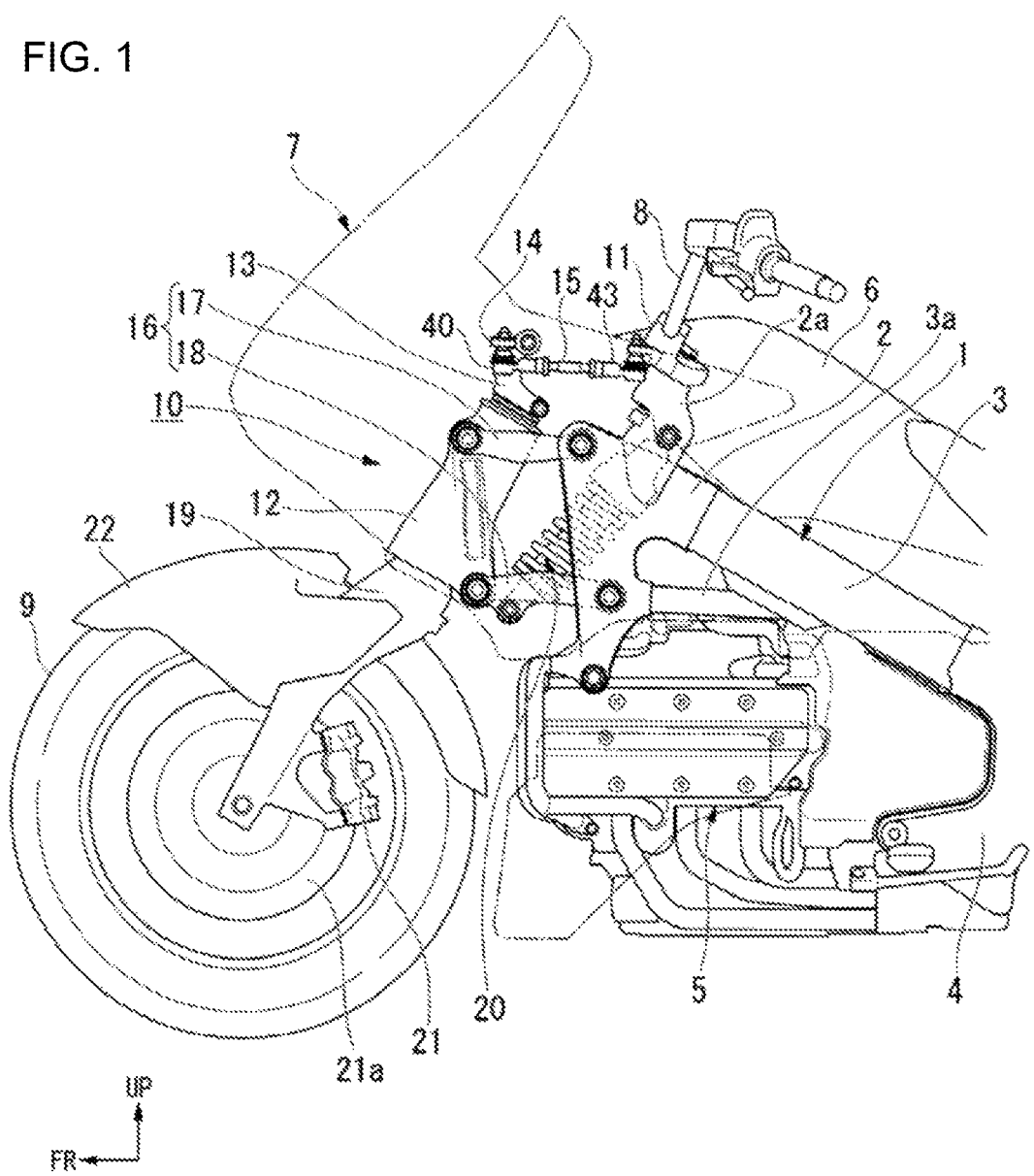
FIG. 1 is a left side view of a front portion of a vehicle body of a motorcycle according to an embodiment of the present invention.

An embodiment of the present invention will hereinafter be described with reference to the drawings. Incidentally, directions such as a forward direction, a rearward direction, a left direction, a right direction, and the like in the following description are identical with directions in a vehicle to be described in the following unless otherwise specified. In addition, an arrow FR indicating the forward direction of the vehicle, an arrow LH indicating the left direction of the vehicle, an arrow UP indicating the upward direction of the vehicle, and a lateral center line CL of the vehicle are shown in appropriate positions in the drawings to be used in the following description.

FIG. 1 shows a front portion of a vehicle body of a motorcycle as an example of a saddle riding type vehicle. Referring to FIG. 1, a vehicle body frame 1 of the motorcycle has a front block 2 as a front end portion of the vehicle body frame 1 which front block 2 supports a front wheel suspension device 10.

A pair of left and right main frames 3 extends rearward and downward from the rear of the front block 2, and a pair of left and right sub-frames 3a extends rearward from the rear of the front block 2. The left and right main frames 3 are connected to a pivot frame 4 that supports a rear wheel suspension device not shown in the figures. A horizontally opposed engine 5, for example, is mounted below the front block 2, the left and right main frames 3, and the left and right sub-frames 3a. A fuel tank 6 is disposed on the front block 2 and the left and right main frames 3. The front portion of the vehicle body of the motorcycle is covered by a front cowl 7 made of a synthetic resin.

Figure 2:
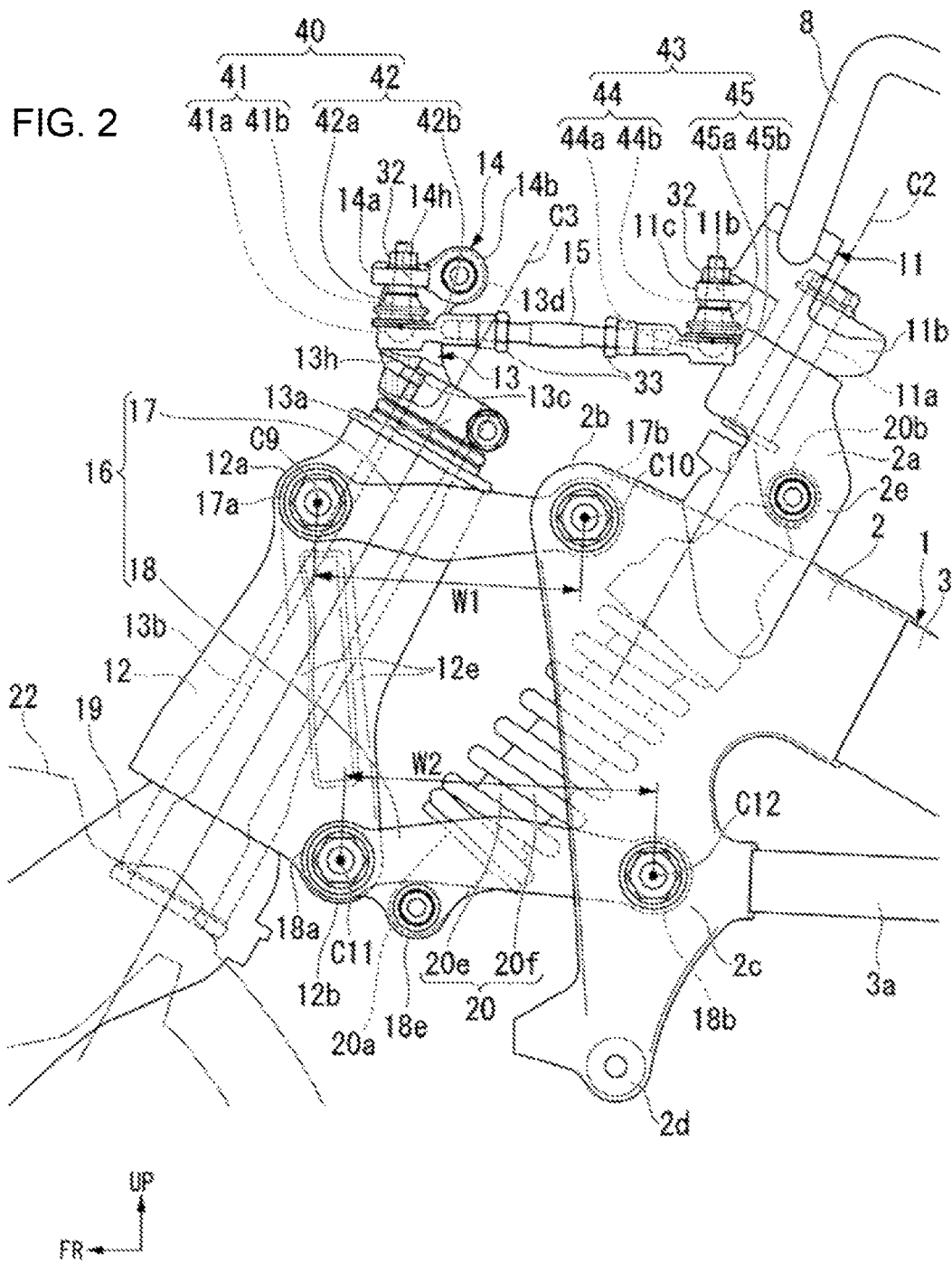
FIG. 2 is a left side view of a front wheel suspension device of the motorcycle.
Figure 3:
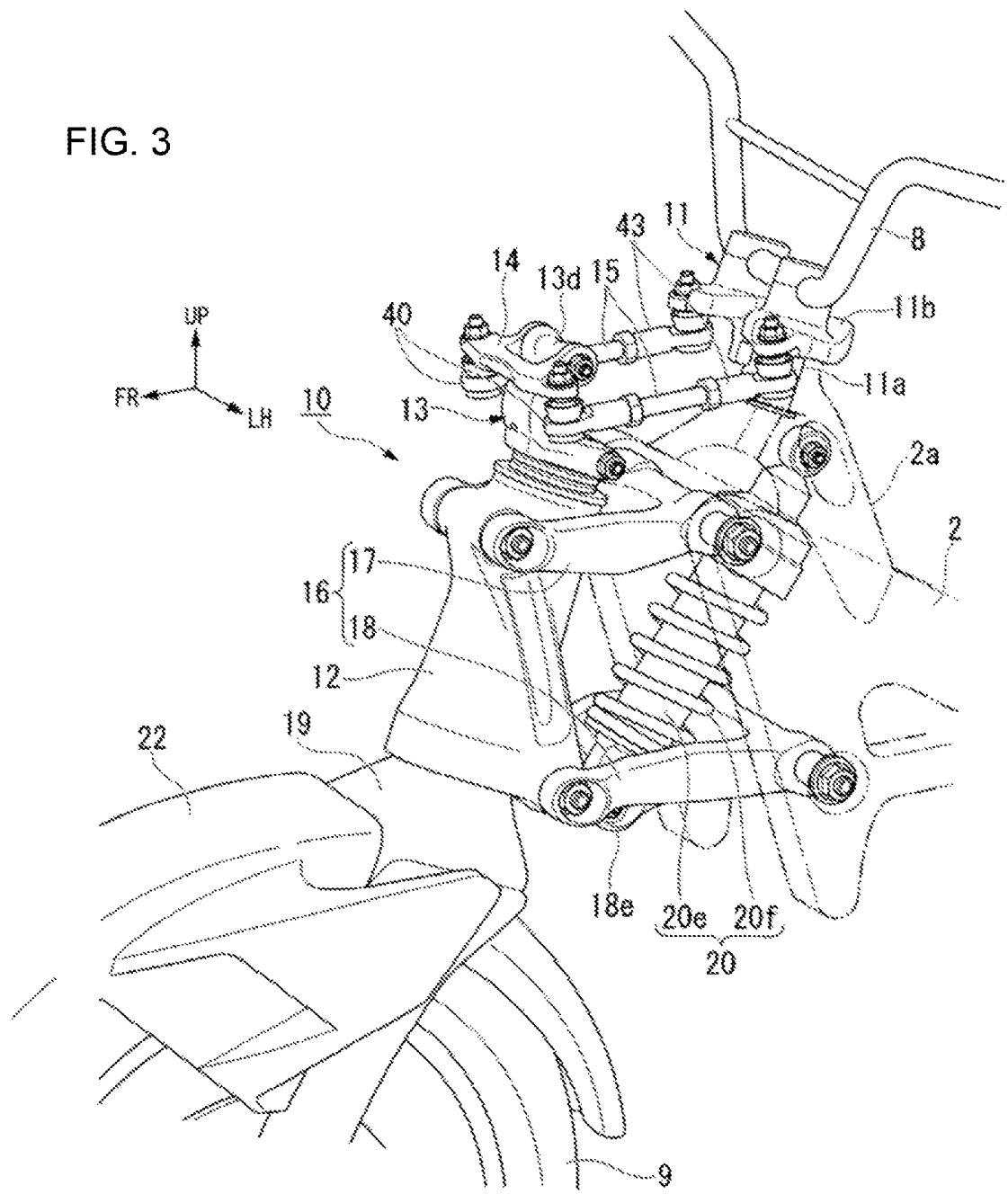
FIG. 3 is a perspective view of the front wheel suspension device as viewed from an upper left front.

Referring also to FIG. 2 and FIG. 3, the front block 2 has a V-shape projecting forward and upward as viewed from the side. Connecting portions 2b to which rear end portions 17b of an upper arm portion 17 to be described later are connected are formed in a front upper end portion of the front block 2. Connecting portions 2c to which rear end portions 18b of a lower arm portion 18 to be described later are connected are formed in the vicinity of a vertical center of the front block 2.

Supporting portions 2d supporting a left side portion and a right side portion of the engine 5 are formed in a front lower end portion of the front block 2.

The front wheel suspension device 10 includes a supporting portion 2a, a handlebar post 11, a head pipe 12, a turning member 13, a rotary member 14, link members 15, a rocking arm 16, a front fork 19, and a cushion unit 20.

Figure 8:
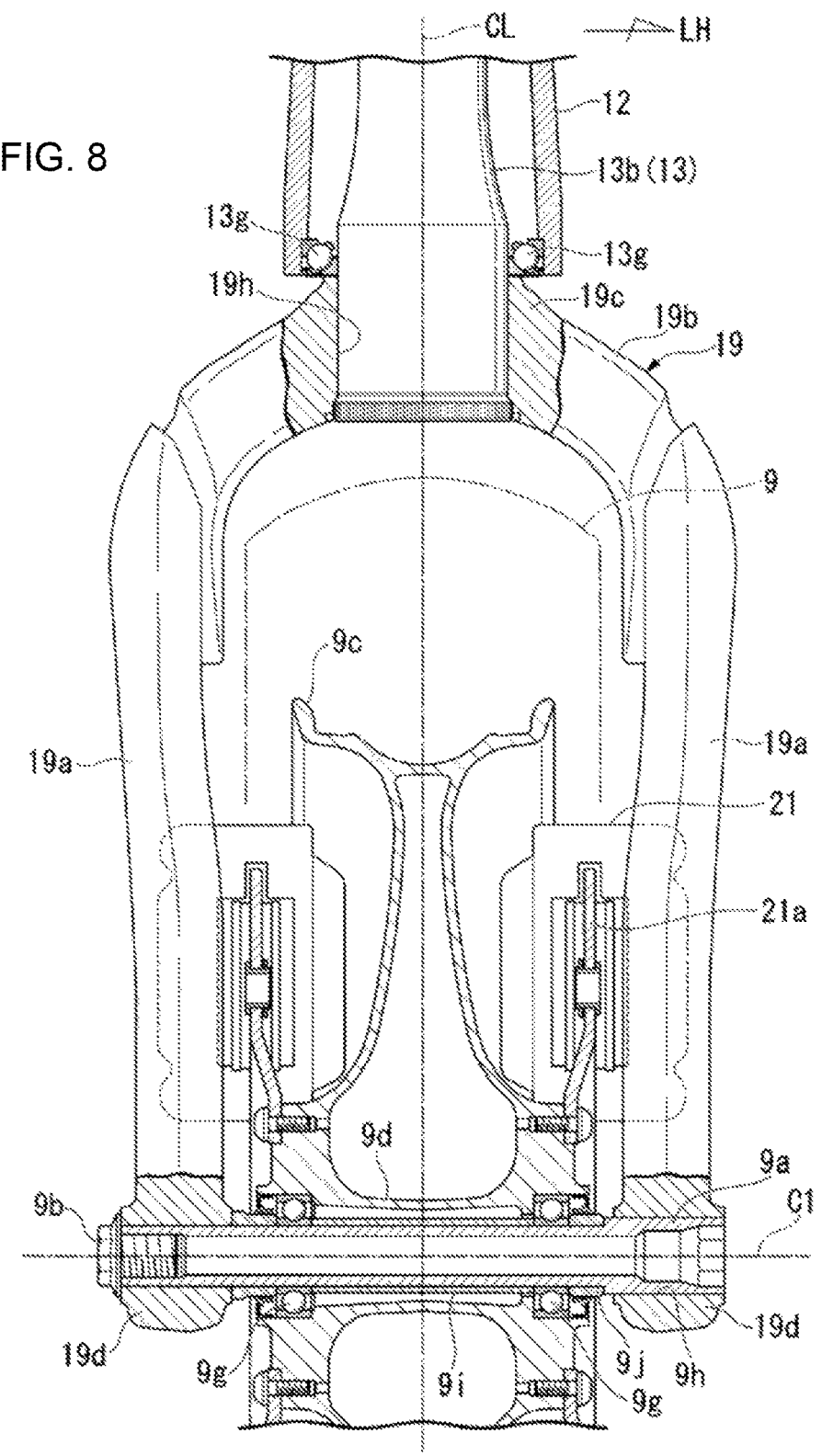
FIG. 8 is a sectional view including a section of a connecting portion of an upper end portion of a front fork of the front wheel suspension device along the longitudinal direction of a head pipe and a section along a central axis of a front wheel axle.
Figure 9:
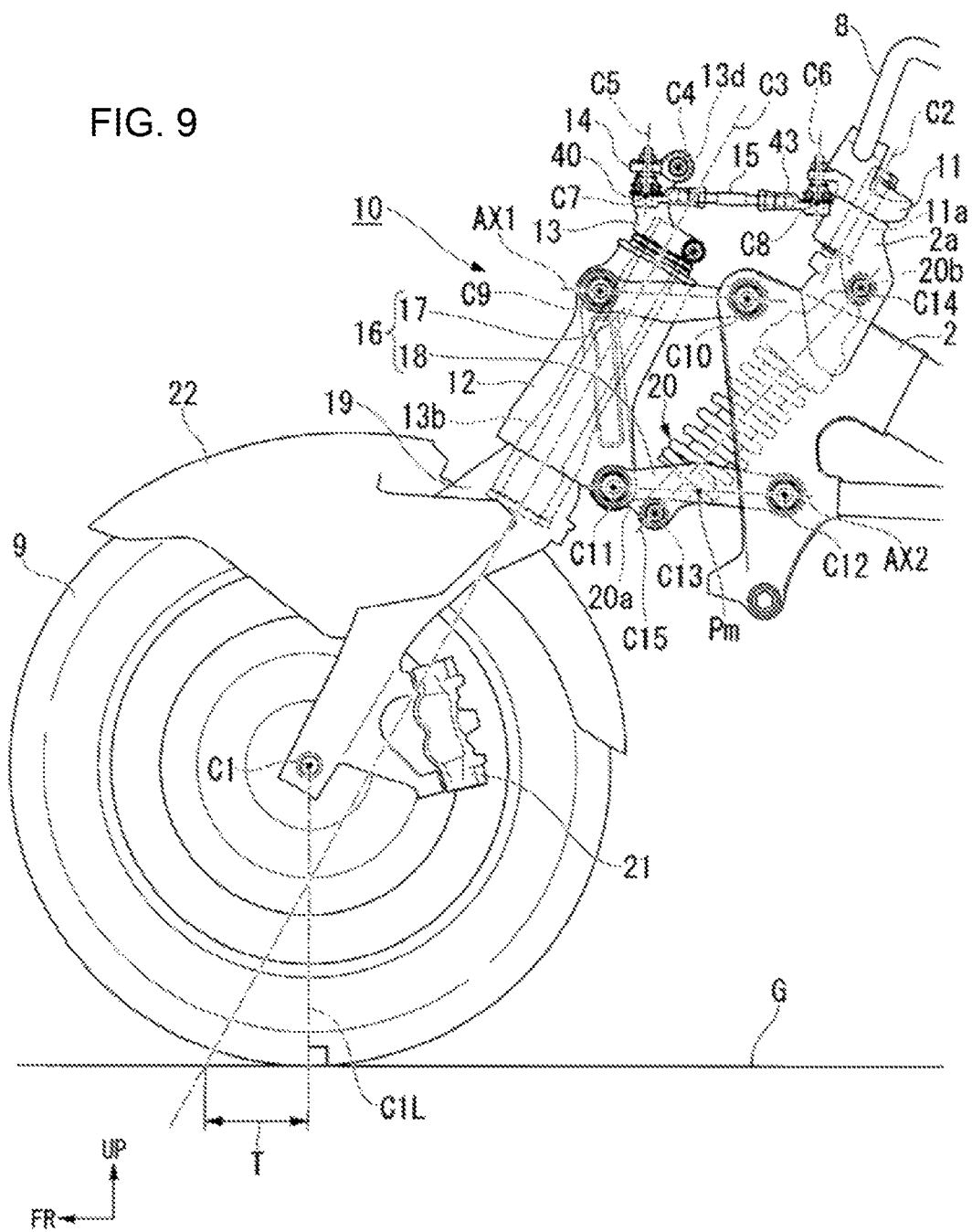

Referring also to FIG. 8 and FIG. 9, the front fork 19 is disposed below the head pipe 12. The front fork 19 has an upper end portion connected to a shaft portion 13b of the turning member 13, and has a lower end portion supporting a front wheel axle 9a of the front wheel 9 as a steered wheel.

The front fork 19 integrally has a pair of left and right arm portions 19a extending vertically and a cross member 19b coupling upper end portions of the left and right arm portions 19a to each other. The elements of the front fork 19 are each an integral part made of aluminum, for example. These elements are joined by welding to be integral with each other.

The left and right arm portions 19a are arranged on both of the left side and the right side of the front wheel 9. The cross member 19b is curved to the inside in a vehicle width direction in such a manner as to be along a tread surface at an upper end position of the front wheel 9, and is disposed between the upper end portions of the left and right arm portions 19a. The left and right end portions of the cross member 19b are joined to the upper end portions of the left and right arm portions 19a.

A connecting portion 19c to which the shaft portion 13b of the turning member 13 is connected is formed in an upper end portion of the cross member 19b. An insertion hole 19h opening in a direction in which the shaft portion 13b of the turning member 13 extends is formed in the connecting portion of the cross member 19b. The shaft portion 13b of the turning member 13 has a maximum diameter at a lower end portion thereof. The shaft portion 13b is inserted into the insertion hole 19h from an upper end portion of the shaft portion 13b, and a lower end portion of the shaft portion 13b and the connecting portion 19c are joined to each other by welding in a state in which the lower end portion of the shaft portion 13b is located in the insertion hole 19h, whereby the upper end portion of the front fork 19 is fixedly connected to the shaft portion 13b of the turning member 13.

Incidentally, a symbol 13g in the figures denotes a ball bearing retained in an inner circumference of a lower end portion of the head pipe 12.

Connecting portions 19d to which the front wheel axle 9a is connected are formed in lower end portions of the left and right arm portions 19a. An insertion hole 9h opening in the vehicle width direction is formed in the connecting portions 19d of the left and right arm portions 19a. In a state of a hub portion 9d of a wheel 9c of the front wheel 9 being held between the connecting portions 19d of the left and right arm portions 19a, a bolt 9b is passed through the insertion holes 9h and an inner circumference of the hub portion 9d of the wheel 9c, and is screwed and fastened to one end of the front wheel axle 9a. An outer circumference of the front wheel axle 9a is provided with a pair of left and right side collars 9j, a pair of left and right ball bearings 9g adjacent to the insides of the left and right side collars 9j, and a center collar 9i for securing a distance between the left and right ball bearings 9g. Both end portions in the vehicle width direction of the front wheel axle 9a are fixedly supported by the lower end portion of the front fork 19, and the wheel 9c of the front wheel 9 is rotatably supported by a center in the vehicle width direction of the front wheel axle 9a via the left and right ball bearings 9g.

Incidentally, a symbol 21a denotes a brake rotor whose inner rotor is fixed to both of a left end and a right end of the hub portion 9d. A symbol C1 in the figures denotes the central axis of the front wheel axle 9a. A symbol C1L in the figures denotes a perpendicular from the central axis C1 to a ground G. A symbol T in the figures denotes a trail.

A brake caliper 21 is supported in the rear of the lower portion (left and right arm portions 19a) of the front fork 19. A front fender 22 is supported on the upper portion (cross member 19b) of the front fork 19 via a bolt not shown in the figures.

Referring also to FIG. 2, FIG. 3, and FIG. 9, the supporting portion 2a is provided on a longitudinal center of the upper end portion of the front block 2 so as to be inclined rearward with respect to a vertical direction as viewed from the side. The supporting portion 2a is for example provided integrally with the upper front end portion of the front block 2 made of aluminum. An upper portion of the supporting portion 2a rotatably (steerably) supports the handlebar post 11, and a lower portion of the supporting portion 2*a* rockably supports a rear upper end portion 20*b* of the cushion unit 20.

Specifically, a shaft portion 11*a* of the handlebar post 11 is inserted into an inner circumference of the upper portion of the supporting portion 2*a*, and the supporting portion 2*a* rotatably (steerably) supports the shaft portion 11*a*. A ball bearing not shown in the figures is retained in the inner circumference of the supporting portion 2*a*. An upper end portion of the shaft portion 11*a* projects above the supporting portion 2*a*. This projecting portion fixedly supports a holder 11*b* of the handlebar post 11. A pair of left and right connecting portions 2*e* to which the rear upper end portion 20*b* of the cushion unit 20 is connected is formed in both sides in the vehicle width direction of the lower portion of the supporting portion 2*a*.

Incidentally, a symbol C2 in the figures denotes the central axis of the shaft portion 11*a*. The central axis C2 may hereinafter be referred to as a steering axis. The shaft portion 11*a* of the handlebar post 11 forms the steering axis C2.

Figure 5:
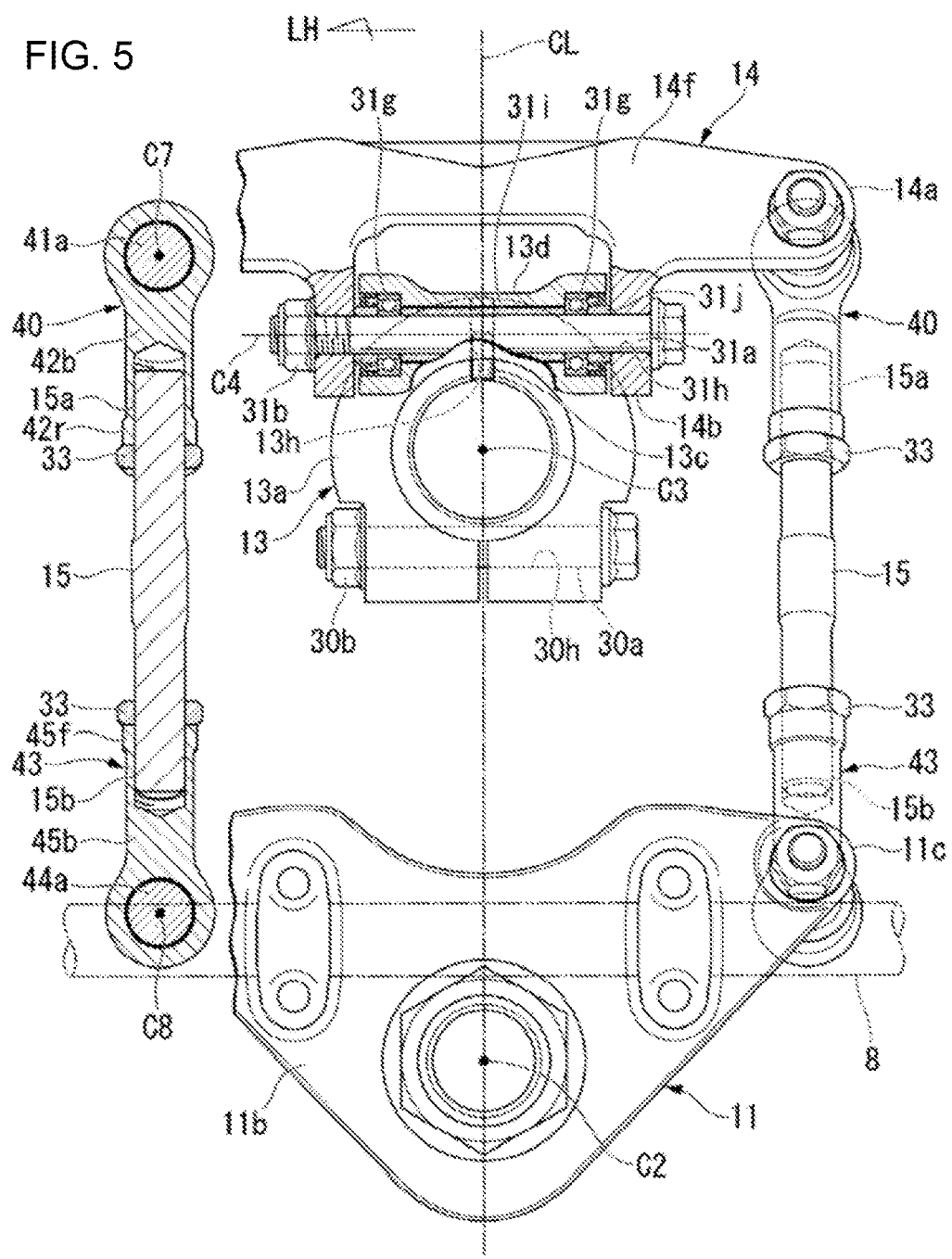
FIG. 5 is a sectional view including a section along a rotation axis of the front wheel suspension device and a horizontal section of a left link member.

Referring to FIG. 5, the handlebar post 11 forms a V-shape projecting rearward as viewed in a direction along the steering axis C2. A laterally central portion of the handlebars 8 is fixedly supported on the holder 11*b* of the handlebar post 11. Referring to FIG. 2, the shaft portion 11*a* of the handlebar post 11 is rotatably supported by the supporting portion 2*a*, and thereby the handlebars 8 above the supporting portion 2*a* are supported by the handlebar post 11 rotatably (steerably) about the shaft portion 11*a* (steering axis C2). Connecting portions 11*c* to which a left second ball joint 43 and a right second ball joint 43 to be described later are connected are formed in a left end portion and a right end portion of the handlebar post 11.

Referring also to FIG. 2, FIG. 8, and FIG. 9, the head pipe 12 is disposed so as to be separated frontward from the steering axis C2. The head pipe 12 is inclined such that an upper side of the head pipe 12 is located more rearward than a lower side of the head pipe 12 as viewed from the side. Specifically, the head pipe 12 forms a cylindrical shape, and is disposed in front of the supporting portion 2*a* (front block 2) so as to be inclined rearward with respect to the vertical direction. The head pipe 12 radially internally supports the shaft portion 13*b* of the turning member 13 rotatably (steerably) about the central axis C3 of the shaft portion 13*b*. A connecting portion 12*a* to which the front end portion 17*a* of the upper arm portion 17 is connected is formed in front of the steering axis C3 and in the front upper portion of the head pipe 12 so as to project forward and upward. A connecting portion 12*b* to which the front end portion 18*a* of the lower arm portion 18 is connected is formed in the rear of the steering axis C3 and in the rear lower portion of the head pipe 12 so as to project rearward and downward.

Incidentally, the central axis C3 of the shaft portion 13*b* coincides with the central axis of the head pipe 12. The central axis C3 may hereinafter be referred to as a steering axis (turning axis). The angle of the steering axis C3 to the vertical direction is a "caster angle." The steering axis C3 is offset (separate) frontward from the steering axis C2, and forms the shape of a straight line inclined such that an upper side of the straight line is located more rearward than a lower side of the straight line as viewed from the side. The steering axis C3 and the steering axis C2 are parallel to each other in a 1G state in which the load of a vehicle weight is applied to the front wheel suspension device 10 in the figures (which state may hereinafter be referred to simply as a "1G state").

Referring also to FIG. 2 and FIG. 5, the turning member 13 is rotatably supported by the head pipe 12, and is steered about the steering axis C3 integrally with the front wheel 9.

The turning member 13 includes an upper portion 13*a* and the shaft portion 13*b*. The upper portion 13*a* has a C-shape whose front portion projects frontward as viewed from the side. The shaft portion 13*b* extends along the direction in which the head pipe 12 extends.

A lower end portion of the upper portion 13*a* forms a C-shape opening to the rear as viewed from a direction along the steering axis C3. An insertion hole 13*h* into which a positioning pin 13*c* is inserted is formed in a front lower end portion of the upper portion 13*a*. An insertion hole 30*h* opening in the vehicle width direction is formed in a rear lower end portion of the upper portion 13*a*. In a state of the pin 13*c* being inserted in the insertion hole 13*h*, a bolt 30*a* is passed through the insertion hole 30*h*, and is screwed and fastened to a nut 30*b*, whereby the lower end portion of the upper portion 13*a* is fastened and fixed to the upper end portion of the shaft portion 13*b*.

Referring also to FIG. 2, FIG. 4, FIG. 5, and FIG. 9, a cylindrical journaling portion 13*d* extending in the vehicle width direction is formed in an upper end portion of the upper portion 13*a*. The journaling portion 13*d* is disposed on the upper side of the left and right link members 15 as viewed from the side. The journaling portion 13*d* supports the rotary member 14 such that the rotary member 14 is rotatable coaxially with the journaling portion 13*d*.

Incidentally, a symbol C4 in the figures denotes the central axis of the journaling portion 13*d*. The central axis C4 may hereinafter be referred to as a rotation axis.

The rotary member 14 is disposed between front end portions of the left and right link members 15 and the turning member 13. The rotary member 14 is disposed in the vicinities of front ends of the left and right link members 15 and between the left and right link members 15. The rotary member 14 is disposed on the upper side of the left and right link members 15.

Figure 4:
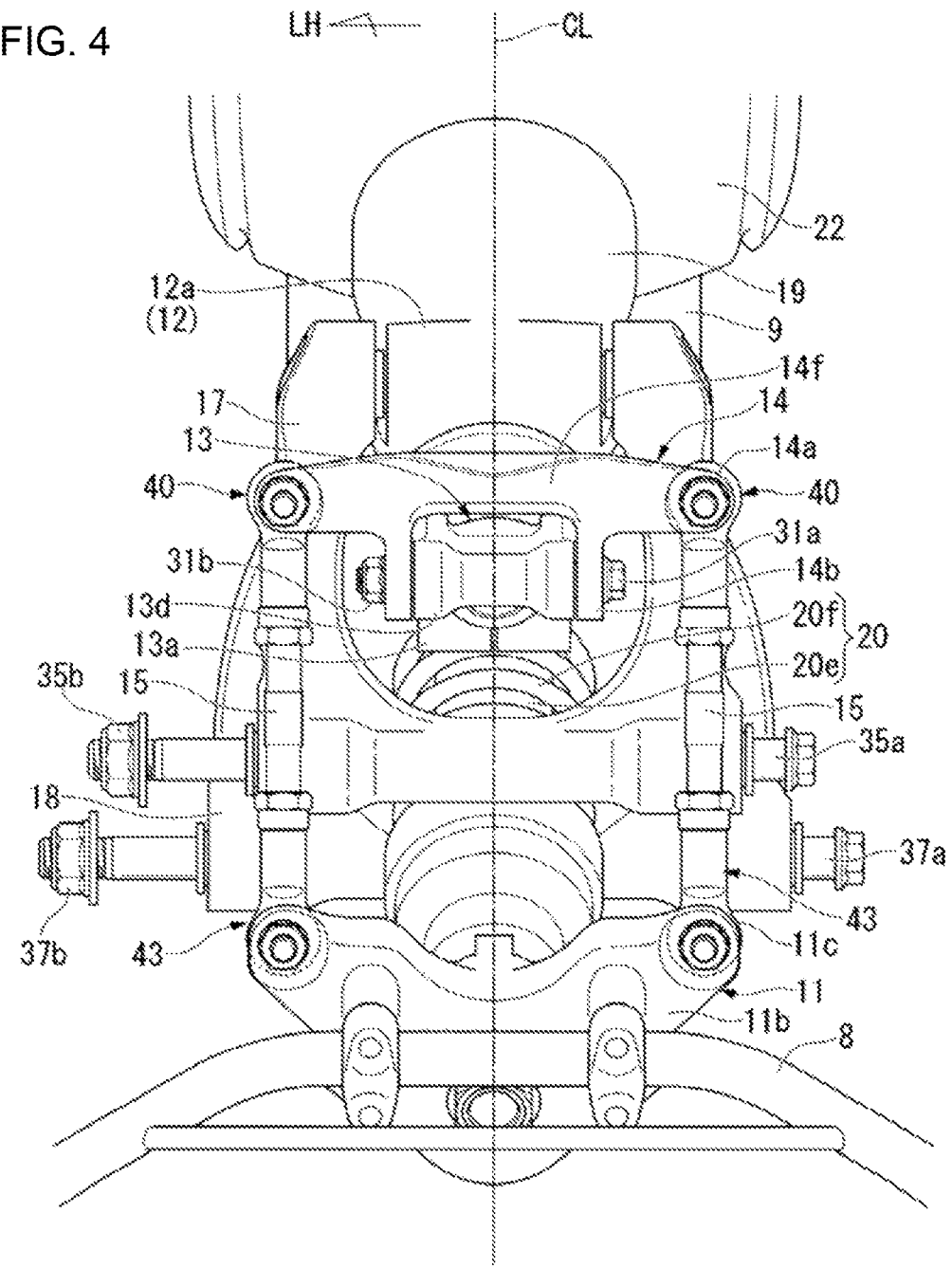
FIG. 4 is a top view of the front wheel suspension device.

Referring to FIG. 4, the rotary member 14 extends in the vehicle width direction so as to have a width equal to that of the handlebar post 11 as viewed from above. The rotary member 14 includes: a main body portion 14*f* located in a front portion of the rotary member 14; and a pair of left and right extending portions 14*b* extending rearward with a predetermined interval therebetween on the inside in the vehicle width direction of the main body portion 14*f*. Connecting portions 14*a* to which a left first ball joint 40 and a right first ball joint 40 to be described later are connected are formed in a left end portion and a right end portion of the main body portion 14*f*.

Referring also to FIG. 5, an insertion hole 31*h* opening in the vehicle width direction is formed in the left and right extending portions 14*b* of the rotary member 14. In a state of the cylindrical journaling portion 13*d* being held between the left and right extending portions 14*b*, a bolt 31*a* is inserted through the insertion holes 31*h* and an inner circumference of the journaling portion 13*d*, and a nut 31*b* is screwed and fastened to a projecting portion of the bolt 31*a*. An outer circumference of the bolt 31*a* is provided with a pair of left and right side collars 31*j*, a pair of left and right ball bearings 31*g* adjacent to the insides of the left and right side collars 31*j*, and a center collar 31*i* for securing a distance between the left and right ball bearings 31*g*. The journaling portion 13*d* of the turning member 13 supports the rotary member 14 rotatably about the rotation axis C4 via the left and right ball bearings 31*g*.

Referring also to FIG. 2, FIG. 4, and FIG. 5, the link members 15 are provided as a pair of left and right members on both sides in the vehicle width direction. As viewed from above, the left and right link members 15 extend linearly in the forward-rearward direction of the vehicle, and are arranged in parallel with each other in the vehicle width direction. The front end portions of the left and right link members 15 are connected rotatably about a first axis C5 to be described later on the side of the turning member 13, and rear end portions of the left and right link members 15 are connected rotatably about a second axis C6 to be described later on the side of the handlebars 8.

Specifically, the front end portions of the left and right link members 15 are connected with a pair of left and right first ball joints 40 provided on both sides in the vehicle width direction. The rear end portions of the left and right link members 15 are connected with a pair of left and right second ball joints 43 provided on both sides in the vehicle width direction. The front end portions of the left and right link members 15 are rotatably connected to the left and right connecting portions 14a of the rotary member 14 via the left and right first ball joints 40, and the rear end portions of the left and right link members 15 are rotatably connected to the left and right connecting portions 11c of the handlebar post 11 via the left and right second ball joints 43.

The left and right first ball joints 40 each include a first ball stud 41 and a first socket 42.

The left and right first ball studs 41 each include a spherical ball portion 41a and a stud portion 41b projecting upward from the ball portion 41a. The left and right ball portions 41a are slidably retained within the left and right first sockets 42. The left and right stud portions 41b extend linearly in the upward-downward direction of the vehicle.

The left and right first sockets 42 each include a first upper socket 42a and a first lower socket 42b. The ball portion 41a is slidably retained between the first upper socket 42a and the first lower socket 42b.

An insertion hole 14h opening in the upward-downward direction of the vehicle is formed in the left and right connecting portions 14a of the rotary member 14. Screw portions of upper end portions of the left and right stud portions 41b are inserted into the left and right insertion holes 14h, and a nut 32 is screwed and fastened to the upward projecting portions of the screw portions, whereby the left and right stud portions 41b are fastened and fixed to the left and right connecting portions 14a of the rotary member 14.

Incidentally, a symbol C5 in the figures denotes the central axis of the left and right stud portions 41b. The central axis C5 may hereinafter be referred to as a first axis. The first axis C5 is a straight line extending in the upward-downward direction of the vehicle. In addition, a symbol C7 in the figures denotes the center of the left and right ball portions 41a. The center C7 of the left and right ball portions 41a are a center of rotation of the left and right first ball joints 40.

The left and right second ball joints 43 each include a second ball stud 44 and a second socket 45.

The left and right second ball studs 44 each include a spherical ball portion 44a and a stud portion 44b projecting upward from the ball portion 44a. The left and right ball portions 44a are slidably retained within the left and right second sockets 45. The left and right stud portions 44b are parallel with the left and right stud portions 41b, and extend linearly in the upward-downward direction of the vehicle.

The left and right second sockets 45 each include a second upper socket 45a and a second lower socket 45b. The ball portion 44a is slidably retained between the second upper socket 45a and the second lower socket 45b.

An insertion hole 11h opening in the upward-downward direction of the vehicle is formed in the left and right connecting portions 11c of the handlebar post 11. Screw portions of upper end portions of the left and right stud portions 44b are inserted into the left and right insertion holes 11h, and a nut 32 is screwed and fastened to the upward projecting portions of the screw portions, whereby the left and right stud portions 44b are fastened and fixed to the left and right connecting portions 11c of the handlebar post 11.

Incidentally, a symbol C6 in the figures denotes the central axis of the left and right stud portions 44b. The central axis C6 may hereinafter be referred to as a second axis. The second axis C6 is a straight line that is parallel with the first axis C5 and which extends in the upward-downward direction of the vehicle. In addition, a symbol C8 in the figures denotes the center of the left and right ball portions 44a. The center C8 of the left and right ball portions 44a is a center of rotation of the left and right second ball joints 43.

The front end portions of the left and right link members 15 are connected to rear end portions 42r of the left and right first lower sockets 42b, and the rear end portions of the left and right link members 15 are connected to front end portions 45f of the left and right second lower sockets 45b. Specifically, the left and right link members 15 are fixed by using a lock nut 33 in a state in which screw portions 15a of the front end portions of the left and right link members 15 are screwed into the rear end portions 42r of the left and right first lower sockets 42b by a predetermined amount, and the left and right link members 15 are fixed by using a lock nut 33 in a state in which screw portions 15b of the rear end portions of the left and right link members 15 are screwed into the front end portions 45f of the left and right second lower sockets 45b by a predetermined amount. Distances between the front and rear connecting portions for the left and right link members 15 can be adjusted by loosening the lock nuts 33 and increasing or decreasing amounts of screwing of the front screw portions 15a and the rear screw portions 15b into the left and right first lower sockets 42b and the left and right second lower sockets 45b, respectively.

The left and right link members 15 form parallel links together with the rotary member 14 and the handlebar post 11 as viewed in the direction along the steering axis C2 and the steering axis C3. Therefore, the front wheel 9 can be turned at the same angle as the steering angle of the handlebars 8. In addition, the left and right link members 15 linearly interlock the steering operation of the handlebars 8 with the steering operation of the turning member 13.

Referring also to FIG. 2, FIG. 3, and FIG. 9, the front end portion of the rocking arm 16 is rockably supported by the head pipe 12, and the rear end portion of the rocking arm 16 is rockably supported by the front block 2. The rocking arm 16 has a pair of upper and lower arm portions 17 and 18. The upper and lower arm portions 17 and 18 are arranged in juxtaposition to each other in the upward-downward direction of the vehicle, and extend along the forward-rearward direction of the vehicle.

The front and rear end portions 17a and 17b of the upper arm portion 17 of the rocking arm 16 are respectively arranged in front of the front and rear end portions 18a and 18b of the lower arm portion 18 of the rocking arm 16. The front end portions 17a of the upper arm portion 17 of the rocking arm 16 are supported in front of the steering axis C3, and the front end portions 18a of the lower arm portion 18 of the rocking arm 16 are supported in the rear of the steering axis C3. The front end portions 17a of the upper arm portion 17 of the rocking arm 16 are disposed below an upper end of the head pipe 12, and the front end portions 18a of the lower arm portion 18 are disposed in the vicinity of a lower end of the head pipe 12.

Figure 6:
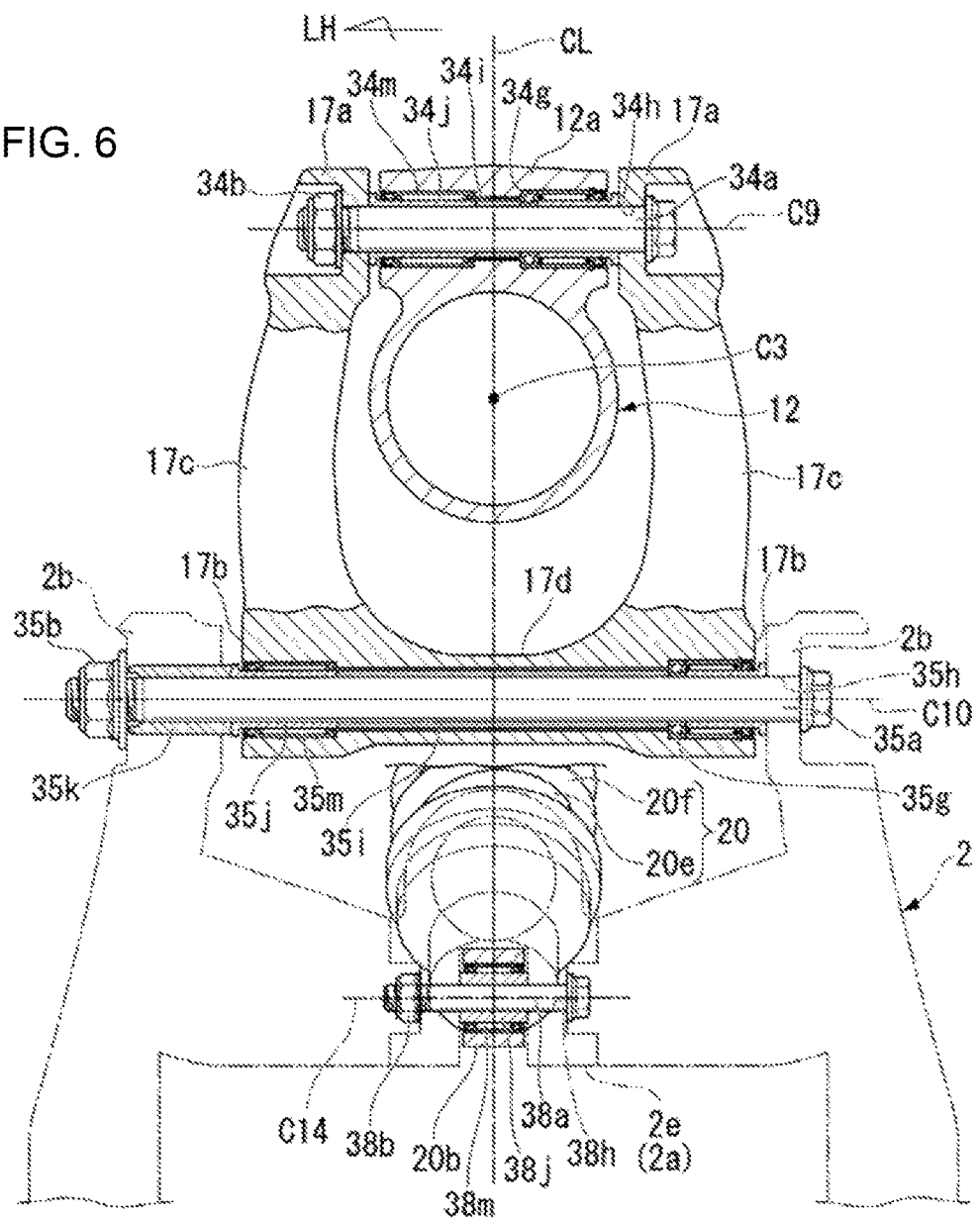
FIG. 6 is a sectional view including a section along a first coupling axis of an upper arm portion of the front wheel suspension device and a section along a second coupling axis.

Referring also to FIG. 6, the front end portions 17a of the upper arm portion 17 are rockably supported via a bolt 34a as a coupling member that penetrates the connecting portion 12a of the head pipe 12 and which extends along the vehicle width direction. The rear end portions 17b of the upper arm portion 17 are rockably supported via a bolt 35a as a coupling member that penetrates the connecting portions 2b of the front block 2 and which extends along the vehicle width direction.

The upper arm portion 17 integrally includes a pair of left and right arm main bodies 17c extending longitudinally and a cross member 17d coupling the rear end portions 17b of the left and right arm main bodies 17c to each other. The elements of the upper arm portion 17 are each an integral part made of aluminum, for example. These elements are joined by welding to be integral with each other.

The left and right arm main bodies 17c are arranged on both of the left and right sides of an upper portion of the head pipe 12. The left and right arm main bodies 17c are curved to the inside in the vehicle width direction in such a manner as to be along an outer wall surface of the upper portion of the head pipe 12.

The cross member 17d extends in the vehicle width direction in the rear of the upper portion of the head pipe 12. Both of end portions of the cross member 17d are joined to the rear end portions 17b of the left and right arm main bodies 17c.

An insertion hole 34h opening in the vehicle width direction is formed in the front end portions 17a of the left and right arm main bodies 17c. In a state of the connecting portion 12a of the head pipe 12 being held between the front end portions 17a of the left and right arm main bodies 17c, the bolt 34a is passed through the insertion holes 34h and an inner circumference of the connecting portion 12a, and is screwed and fastened to a nut 34b. An outer circumference of the bolt 34a is provided with a pair of left and right side collars 34j for supporting a pair of left and right needle bearings 34m, a center collar 34i for securing a distance between the left and right side collars 34j, and a ball bearing 34g receiving a thrust via the right side collar 34j and the center collar 34i. The front end portions 17a of the upper arm portion 17 are rockably supported by the connecting portion 12a via the left and right side collars 34j, the center collar 34i, and the ball bearing 34g.

Incidentally, a symbol C9 in the figures denotes the central axis of the bolt 34a. The central axis C9 may hereinafter be referred to as a first coupling axis. The first coupling axis C9 is disposed between the upper end and the lower end of the head pipe 12 as viewed from the side.

An insertion hole 35h opening in the vehicle width direction is formed in the left and right connecting portions 2b of the front block 2. An adjusting collar 35k for adjusting a lateral gap is provided in the left connecting portion 2b of the front block 2. In a state of the rear end portions 17b of the upper arm portion 17 (the rear end portions 17b of the left and right arm main bodies 17c and the cross member 17d) being held between the left and right connecting portions 2b of the front block 2, the bolt 35a is passed through the insertion holes 35h and inner circumferences of the rear end portions 17b of the upper arm portion 17, and is screwed and fastened to a nut 35b. An outer circumference of the bolt 35a is provided with a pair of left and right side collars 35j for supporting a pair of left and right needle bearings 35m, a center collar 35i for securing a distance between the left and right side collars 35j, and a ball bearing 35g receiving a thrust via the right side collar 35j and the center collar 35i. The rear end portions 17b of the upper arm portion 17 are rockably supported by the left and right connecting portions 2b via the left and right side collars 35j, the center collar 35i, and the ball bearing 35g.

Incidentally, a symbol C10 in the figures denotes the central axis of the bolt 35a. The central axis C10 may hereinafter be referred to as a second coupling axis.

Figure 7:
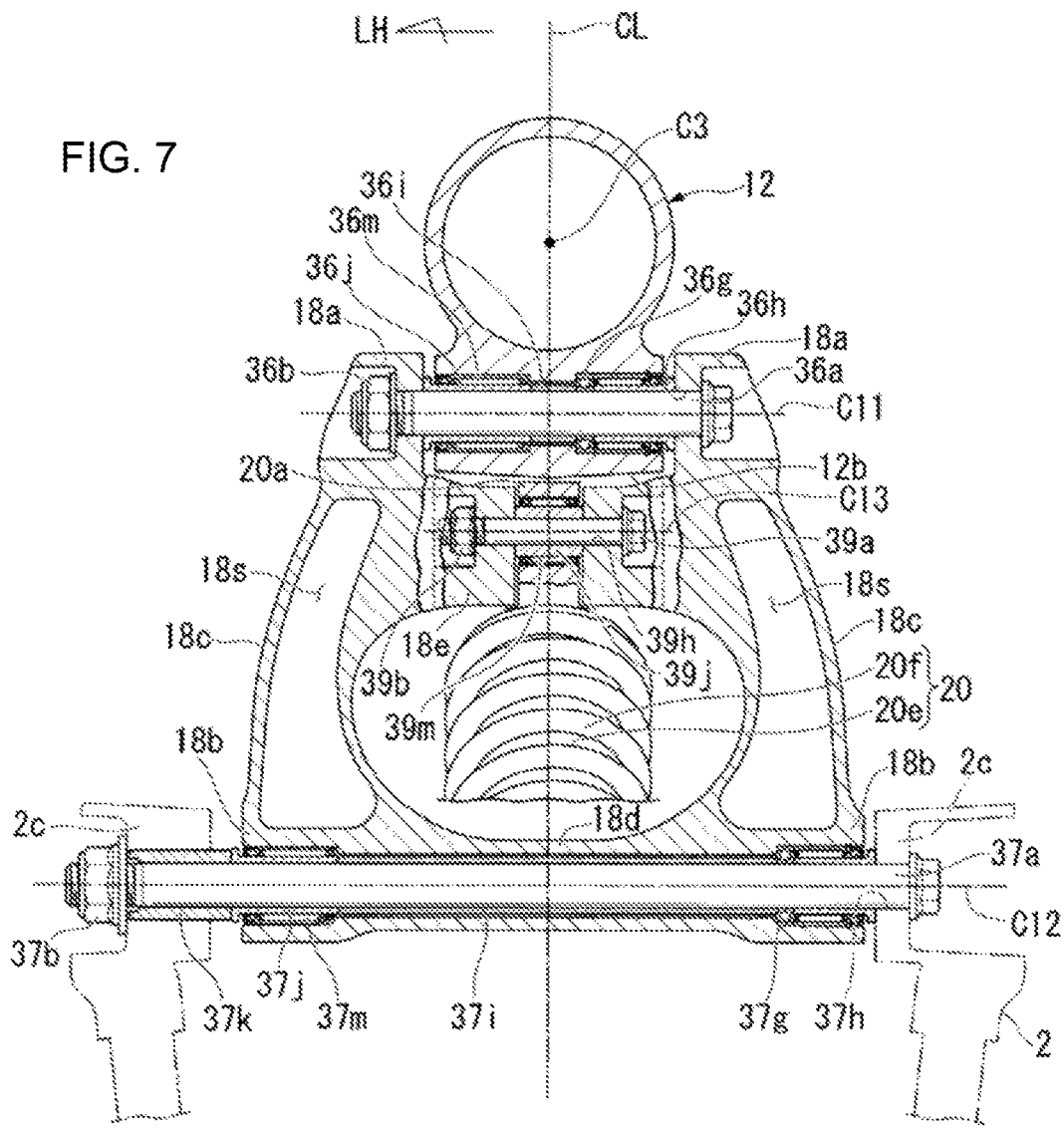
FIG. 7 is a sectional view including a section along a third coupling axis of a lower arm portion of the front wheel suspension device, a section along a fourth coupling axis, and a section along a central axis of a connecting portion for connecting a front lower end portion of a cushion unit.

Referring also to FIG. 7, the front end portions 18a of the lower arm portion 18 are rockably supported via a bolt 36a as a coupling member that penetrates the connecting portion 12b of the head pipe 12 and which extends along the vehicle width direction. The rear end portions 18b of the lower arm portion 18 are rockably supported via a bolt 37a as a coupling member that penetrates the connecting portions 2c of the front block 2 and which extends along the vehicle width direction. Connecting portions 18e to which a front lower end portion 20a of the cushion unit 20 is connected are formed in a front lower portion of the lower arm portion 18.

The lower arm portion 18 integrally includes a pair of left and right arm main bodies 18c extending longitudinally and a cross member 18d coupling the rear end portions 18b of the left and right arm main bodies 18c to each other. The elements of the lower arm portion 18 are each an integral part made of aluminum, for example. These elements are joined by welding to be integral with each other. The longitudinal length of the lower arm portion 18 is larger than the longitudinal length of the upper arm portion 17. Referring to FIG. 2, as viewed from the side, a length W2 of a second segment connecting a third coupling axis C11 to a fourth coupling axis C12 is larger than a length W1 of a first segment connecting the first coupling axis C9 to the second coupling axis C10 (W2>W1).

The left and right arm main bodies 18c are arranged on both of the left and right sides of a lower portion of the cushion unit 20. The left and right arm main bodies 18c are curved to the inside in the vehicle width direction in such a manner as to be along an outer circumferential surface of the lower portion of the cushion unit 20 (spring 20f to be described later). Spaces 18s curved to the inside in the vehicle width direction are formed within the left and right arm main bodies 18c.

The cross member 18d extends in the vehicle width direction in the rear of the lower portion of the cushion unit 20. Both of end portions of the cross member 18d are joined to the rear end portions 18b of the left and right arm main bodies 18c.

An insertion hole 36h opening in the vehicle width direction is formed in the front end portions 18a of the left and right arm main bodies 18c. In a state of the connecting portion 12b of the head pipe 12 being held between the front end portions 18a of the left and right arm main bodies 18c, a bolt 36a is passed through the insertion holes 36h and an inner circumference of the connecting portion 12b, and is screwed and fastened to a nut 36b. An outer circumference of the bolt 36a is provided with a pair of left and right side collars 36j for supporting a pair of left and right needle bearings 36m, a center collar 36i for securing a distance between the left and right side collars 36j, and a ball bearing 36g receiving a thrust via the right side collar 36j and the center collar 36i. The front end portions 18a of the lower arm portion 18 are rockably supported by the connecting portion 12b via the left and right side collars 36j, the center collar 36i, and the ball bearing 36g.

Incidentally, a symbol C11 in the figures denotes the central axis of the bolt 36a. The central axis C11 may hereinafter be referred to as a third coupling axis. The third coupling axis C11 is disposed between the upper end and the lower end of the head pipe 12 as viewed from the side.

An insertion hole 37h opening in the vehicle width direction is formed in the left and right connecting portions 2c of the front block 2. An adjusting collar 37k for adjusting a lateral gap is provided to the left connecting portion 2c of the front block 2. In a state of the rear end portions 18b of the lower arm portion 18 (the rear end portions 18b of the left and right arm main bodies 18c and the cross member 18d) being held between the left and right connecting portions 2c of the front block 2, a bolt 37a is passed through the insertion holes 37h and inner circumferences of the rear end portions 18b of the lower arm portion 18, and is screwed and fastened to a nut 37b. An outer circumference of the bolt 37a is provided with a pair of left and right side collars 37j for supporting a pair of left and right needle bearings 37m, a center collar 37i for securing a distance between the left and right side collars 37j, and a ball bearing 37g receiving a thrust via the right side collar 37j and the center collar 37i. The rear end portions 18b of the lower arm portion 18 are rockably supported by the left and right connecting portions 2c via the left and right side collars 37j, the center collar 37i, and the ball bearing 37g.

Incidentally, a symbol C12 in the figures denotes the central axis of the bolt 37a. The central axis C12 may hereinafter be referred to as a fourth coupling axis.

In addition, as viewed from the side in FIG. 2, a bead shape 12e is formed between the connecting portion 12a and the connecting portion 12b of the head pipe 12. The bead shape 12e is formed along a segment connecting the first coupling axis C9 to the third coupling axis C11.

In addition, a symbol AX1 in the figures denotes a first straight line passing through the first coupling axis C9 and the second coupling axis C10 as viewed from the side. A symbol AX2 in the figures denotes a second straight line passing through the third coupling axis C11 and the fourth coupling axis C12 as viewed from the side.

In the 1G state in the figures, the first straight line AX1 of the upper arm portion 17 and the second straight line AX2 of the lower arm portion 18 are parallel with each other.

Referring also to FIG. 2, FIG. 6, FIG. 7, and FIG. 9, the front lower end portion 20a of the cushion unit 20 is rockably connected to the lower arm portion 18, and the rear upper end portion 20b of the cushion unit 20 is rockably connected to the supporting portion 2a. The cushion unit 20 provides a cushioning action by making the front lower end portion 20a perform a stroke as the lower arm portion 18 rocks.

The cushion unit 20 includes a damper 20e and a spring 20f.

The damper 20e is a rod type damper inclined such that an upper side of the damper is located more rearward than a lower side of the damper as viewed from the side.

The spring 20f is a coil spring wound around the damper 20e.

The cushion unit 20 expands and contracts by performing a stroke along the central axis C15 of the cushion unit 20, and thereby provides a predetermined cushioning action. The central axis C15 may hereinafter be referred to as a stroke axis.

Referring also to FIG. 2 and FIG. 9, the front lower end portion 20a of the cushion unit 20 is supported in front of a middle point Pm of the segment connecting the third coupling axis C11 to the fourth coupling axis C12 as viewed from the side, and the rear upper end portion 20b of the cushion unit 20 is supported in the rear of the second coupling axis C10 as viewed from the side.

The front lower end portion 20a of the cushion unit 20 is located in front of the longitudinal middle position of the lower arm portion 18. The front lower end portion 20a of the cushion unit 20 is located in front of the middle point Pm of the segment connecting the third coupling axis C11 to the fourth coupling axis C12 as viewed from the side, and is located below the segment.

The rear upper end portion 20b of the cushion unit 20 is located in the vicinity of a lower end of the shaft portion 11a of the handlebar post 11 forming the steering axis C2, and in the rear of and below the steering axis C2 as viewed from the side. The rear upper end portion 20b of the cushion unit 20 is located in the rear of the rear end portions 17b of the upper arm portion 17.

The rear upper end portion 20b of the cushion unit 20 is disposed in the rear of the fourth coupling axis C12 as viewed from the side. Specifically, the rear upper end portion 20b of the cushion unit 20 is located above and in the rear of the rear end portions 18b of the lower arm portion 18.

Referring to FIG. 7, an insertion hole 39h opening in the vehicle width direction is formed in the left and right connecting portions 18e of the lower arm portion 18. In a state of the front lower end portion 20a of the cushion unit being held between the left and right connecting portions 18e of the lower arm portion 18, a bolt 39a is inserted through the insertion holes 39h and an inner circumference of the front lower end portion 20a of the cushion unit, and a nut 39b is screwed and fastened to the projecting portion of the bolt 39a. An outer circumference of the bolt 39a is provided with a collar 39j for supporting a needle bearing 39m. The front lower end portion 20a of the cushion unit 20 is rockably supported by the left and right connecting portions 18e via the collar 39j.

Incidentally, a symbol C13 in the figures denotes the central axis of the bolt 39a.

Referring to FIG. 6, an insertion hole 38h opening in the vehicle width direction is formed in the left and right connecting portions 2e of the supporting portion 2a. In a state of the rear upper end portion 20b of the cushion unit being held between the left and right connecting portions 2e of the supporting portion 2a, a bolt 38a is inserted through the insertion holes 38h and an inner circumference of the rear upper end portion 20b of the cushion unit, and a nut 38b is screwed and fastened to the projecting portion of the bolt 38a. An outer circumference of the bolt 38a is provided with a collar 38j for supporting a needle bearing 38m. The rear upper end portion 20b of the cushion unit 20 is rockably supported by the left and right connecting portions 2e via the collar 38j.

Incidentally, a symbol C14 in the figures denotes the central axis of the bolt 38a.

FIG. 1 and FIG. 9 show the 1G state in which the load of the vehicle weight is applied to the front wheel suspension device 10.

When front wheel braking or the like displaces the front wheel 9 relatively upward from this state, the rocking arm 16 rocks upward, and thus the front fork 19 and the head pipe 12 are displaced upward. At this time, the lower arm portion 18 rotates backward in a right-handed direction (clockwise direction) about the fourth coupling axis C12. Then, the lower arm portion 18 displaces the front lower end portion 20a of the cushion unit 20 upward, and thus compresses the cushion unit 20.

When the head pipe 12 is displaced upward, the turning member 13 is also integrally displaced in accordance with the displacement of the head pipe 12. At this time, the rotary member 14 is displaced with respect to the handlebar post 11, and the angle of the steering axis C3 to the steering axis C2 is changed. However, this change is accommodated by the rocking of the left and right first ball joints 40 and the left and right second ball joints 43 and the rotation of the rotary member 14.

On the other hand, when acceleration or the like displaces the front wheel 9 relatively downward from the 1G state, the rocking arm 16 rocks downward, and thus the front fork 19 and the head pipe 12 are displaced downward. At this time, the lower arm portion 18 rotates forward in a left-handed direction (counterclockwise direction) about the fourth coupling axis C12. Then, the lower arm portion 18 displaces the front lower end portion 20a of the cushion unit 20 downward, and thus extends the cushion unit 20.

When the head pipe 12 is displaced downward, the turning member 13 is also integrally displaced in accordance with the displacement of the head pipe 12. At this time, the rotary member 14 is displaced with respect to the handlebar post 11, and the angle of the steering axis C3 to the steering axis C2 is changed. However, this change is accommodated by the rocking of the left and right first ball joints 40 and the left and right second ball joints 43 and the rotation of the rotary member 14.

As described above, the foregoing embodiment is a front suspension structure for a saddle riding type vehicle, the front suspension structure including: a head pipe 12 radially internally supporting a shaft portion 13b forming a steering axis C3 such that the shaft portion 13b is rotatable about the steering axis C3; a front fork 19 connected to a lower end portion of the shaft portion 13b on a lower side of the head pipe 12, the front fork 19 supporting an axle 9a of a steering wheel 9; a link 15 having one end portion connected rotatably on an upper side of a turning member 13 having the shaft portion 13b, and having another end portion connected rotatably on a side of handlebars 8; the head pipe 12 being disposed so as to be separated frontward from a vehicle body frame 1; a rocking arm 16 having a front end portion rockably supported by the head pipe 12, and having a rear end portion rockably supported by the vehicle body frame 1.

According to this constitution, the front end portion of the rocking arm 16 is supported by the head pipe 12 on the outside in the radial direction of the shaft portion 13b forming the steering axis C3. Thus, the position at which the rocking arm 16 is supported can be set arbitrarily. Hence, a degree of freedom of the position at which the arm portion is supported can be increased. In addition, because a turning system of the turning member 13 and the like and a rocking system of the rocking arm 16 and the like are separated from each other, the turning system is not readily affected by rocking.

In addition, in the foregoing embodiment, the rocking arm 16 includes an upper arm portion 17 and a lower arm portion 18 vertically separated from each other, the head pipe 12 is inclined such that an upper side of the head pipe 12 is located more rearward than a lower side of the head pipe 12 as viewed from a side, a front end portion 17a of the upper arm portion 17 is in front of the steering axis C3 and is supported by a front upper portion of the head pipe 12, and a front end portion 18a of the lower arm portion 18 is in a rear of the steering axis C3 and is supported by a rear lower portion of the head pipe 12. Thus, spaces of the front upper portion and the rear lower portion of the head pipe 12 which spaces are created by the inclination of the head pipe 12 can be utilized effectively as spaces for supporting the respective front end portions 17a and 18a of the upper and lower arm portions 17 and 18. It is therefore possible to make the front suspension structure compact and thus shorten an overall length of the front suspension structure. In addition, because the respective front end portions 17a and 18a of the upper and lower arm portions 17 and 18 are distributed longitudinally, the concentration of force on one part can be prevented.

In addition, in the foregoing embodiment, the front end portion 17a of the upper arm portion 17 and the front end portion 18a of the lower arm portion 18 are rockably supported via coupling members 34a and 36a, respectively, the coupling members 34a and 36a penetrating connecting portions 12a and 12b of the head pipe 12 and extending along a vehicle width direction. Thus, the upper and lower arm portions 17 and 18 can be supported by the respective coupling members so as to avoid the head pipe 12. Therefore the respective front end portions 17a and 18a of the upper and lower arm portions 17 and 18 can be supported with high rigidity.

In addition, in the foregoing embodiment, the front end portion 17a of the upper arm portion 17 and the front end portion 18a of the lower arm portion 18 are connected respectively to connecting portions 12a and 12b of the head pipe 12 rockably about coupling axes C9 and C11 along the vehicle width direction, and at least one of the coupling axes C9 and C11 is disposed between an upper end and a lower end of the head pipe 12 as viewed from the side. Thus, the respective front end portions 17a and 18a of the upper and lower arm portions 17 and 18 can be supported on the head pipe 12 compactly.

It is to be noted that the foregoing embodiment has been described by citing an example in which the first straight line AX1 of the upper arm portion 17 and the second straight line AX2 of the lower arm portion 18 are parallel with each other in the 1G state. However, the present invention is not limited to this.

For example, rearward extension parts of the first straight line AX1 of the upper arm portion 17 and the second straight line AX2 of the lower arm portion 18 may intersect each other such that the first straight line AX1 of the upper arm portion 17 and the second straight line AX2 of the lower arm portion 18 are separated from each other more toward the front in the 1G state. For such an intersection arrangement, for example, it is preferable to shift the vertical position of the second coupling axis C10 downward or shift the vertical position of the fourth coupling axis C12 upward as viewed from the side.

In addition, frontward extension parts of the first straight line AX1 of the upper arm portion 17 and the second straight line AX2 of the lower arm portion 18 may intersect each other such that the first straight line AX1 of the upper arm portion 17 and the second straight line AX2 of the lower arm portion 18 are separated from each other more toward the rear in the 1G state. For such an intersection arrangement, for example, it is preferable to shift the vertical position of the second coupling axis C10 upward or shift the vertical position of the fourth coupling axis C12 downward as viewed from the side.

In addition, the foregoing embodiment has been described by citing an example in which the steering axis C3 is separated frontward from the steering axis C2 and the steering axis C3 and the steering axis C2 are parallel with each other in the 1G state. However, the present invention is not limited to this. For example, the steering axis C3 may be separated frontward from the steering axis C2, and the steering axis C3 and the steering axis C2 may intersect each other. That is, it suffices for the steering axis C3 to be separated frontward from the steering axis C2.

In addition, the foregoing embodiment has been described by citing an example in which the first axis C5 is a straight line extending in the upward-downward direction of the vehicle and the second axis C6 is a straight line that is parallel with the first axis C5 and which extends in the upward-downward direction of the vehicle. However, the present invention is not limited to this. For example, the first axis C5 may be a straight line along a direction intersecting the vehicle width direction, and the second rocking straight line C6 may be a straight line that is along a direction intersecting the vehicle width direction and which is different from the first axis C5.

In addition, the foregoing embodiment has been described by citing an example in which each of the first coupling axis C9 and the third coupling axis C11 is disposed between the upper end and the lower end of the head pipe 12 as viewed from the side. However, the present invention is not limited to this. For example, only the first coupling axis C9 may be disposed between the upper end and the lower end of the head pipe 12 as viewed from the side, or only the third coupling axis C11 may be disposed between the upper end and the lower end of the head pipe 12 as viewed from the side. That is, it suffices for at least one of the first coupling axis C9 and the third coupling axis C11 to be disposed between the upper end and the lower end of the head pipe 12 as viewed from the side.

It is to be noted that the present invention is not limited to the foregoing embodiment. For example, the saddle riding type vehicle described above includes vehicles in general that drivers ride astride vehicle bodies thereof. The saddle riding type vehicle described above includes not only motor-cycles (including motor-assisted bicycles and motor scooter type vehicles) but also three-wheeled vehicles (including vehicles having two front wheels and one rear wheel as well as vehicles having one front wheel and two rear wheels).

In addition, the present invention may be applied to vehicles having a longitudinally mounted engine other than a horizontally opposed engine and vehicles having a laterally mounted engine with a crankshaft along the vehicle width direction. The present invention may also be applied to constitutions in which a cushion unit or a cushion arm is supported by an engine as a vehicle body.

The constitution in the foregoing embodiment is an example of the present invention, and is susceptible of various changes without departing from the spirit of the present invention by replacing a constituent element in the embodiment with a well-known constituent element, for example.

We claim:

1. A front suspension structure for a saddle riding vehicle, the front suspension structure comprising:
 a head pipe radially internally supporting a shaft portion forming a steering axis such that the shaft portion is rotatable about the steering axis;
 a front fork connected to a lower end portion of the shaft portion on a lower side of the head pipe, the front fork supporting an axle of a steering wheel; and
 a link member having one end portion connected rotatably on an upper side of a turning member having the shaft portion, and having another end portion connected rotatably on a side of handlebars;
 the head pipe disposed so as to be separated frontward from a vehicle body frame;
 a rocking arm having a front end portion rockably supported by the head pipe, and having a rear end portion rockably supported by the vehicle body frame,
 wherein the rocking arm includes an upper arm portion and a lower arm portion vertically separated from each other,
 the head pipe is inclined such that an upper side of the head pipe is located more rearward than a lower side of the head pipe as viewed from a side,
 a front end portion of the upper arm portion is in front of the steering axis and is supported by a front upper portion of the head pipe, and
 a front end portion of the lower arm portion is in a rear of the steering axis and is supported by a rear lower portion of the head pipe.

2. The front suspension structure for the saddle riding vehicle according to claim 1,
 wherein the front end portion of the upper arm portion and the front end portion of the lower arm portion are rockably supported via coupling members, respectively, the coupling members penetrating connecting portions of the head pipe and extending along a vehicle width direction.

3. The front suspension structure for the saddle riding vehicle according to claim 2,
 wherein the front end portion of the upper arm portion and the front end portion of the lower arm portion are connected respectively to the connecting portions of the head pipe rockably about coupling axes along the vehicle width direction, and
 at least one of the coupling axes is disposed between an upper end and a lower end of the head pipe as viewed from the side.

4. The front suspension structure for the saddle riding vehicle according to claim 1,
 wherein the front end portion of the upper arm portion and the front end portion of the lower arm portion are connected respectively to connecting portions of the head pipe rockably about coupling axes along the vehicle width direction, and
 at least one of the coupling axes is disposed between an upper end and a lower end of the head pipe as viewed from the side.

* * * * *